UNITED STATES PATENT OFFICE.

WETHERILL PETERSON, OF PHILADELPHIA, PENNSYLVANIA.

IMPROVEMENT IN MANUFACTURE OF RED COLORS FROM COPPERAS.

Specification forming part of Letters Patent No. 203,936, dated May 21, 1878; application filed April 18, 1878.

*To all whom it may concern:*

Be it known that I, WETHERILL PETERSON, of Philadelphia, Pennsylvania, have invented a Process of Making Venetian Red, Indian Red, and other colors usually obtained from the oxide of iron by different degrees of heat, of which process the following is a specification:

My process does not apply to the manufacture of pure oxide of iron, but to the making of Venetian red, and the other colors above referred to for pigments where the sulphate of lime is used, in whole or in part, as a body.

Hitherto these colors have been made in various ways, but chiefly by calcining the oxide of iron, previously obtained by precipitation or other processes, with sulphate of lime, or by calcining sulphate of iron (copperas) with the sulphate of lime and driving off the acid of the copperas by heat.

I take sulphate of iron, (copperas,) in powder or crystals, (the refuse copperas obtained from the boiling-pans in the manufacture of copperas and the crystals of copperas not sufficiently large and clean to be sold as copperas may be used,) and mix the same with lime, either quicklime, carbonate of lime, or hydrate of lime (preferably the last) in proper proportions to decompose the sulphate of iron and form oxide of iron and sulphate of lime, adding sufficient sulphate of lime (gypsum) to give the body required, and calcine the whole together in any furnace or vessel, with access of air, until the desired shade of color is obtained, after which the mass is finely ground, so as to form the Venetian red, Indian red, &c., of commerce.

I have found that one hundred and thirty-six pounds of the hydrate of lime, one hundred and seventy-five pounds of copperas, and four hundred pounds of gypsum, when calcined together, give good results. If quicklime is used, about one hundred and four pounds thereof, and if carbonate of lime, about two hundred and twenty pounds thereof, must be used with the last above-named quantity of copperas.

The quantities of lime here stated are a little in excess of the theoretical quantities required; but the excess is added to insure the thorough neutralization of the acid, which is hurtful in the paint, whereas a slight excess of lime is harmless.

As the gypsum is neutral, and does not affect the reaction, (it being employed simply to give body and not color to the product,) it may be altogether omitted, or a smaller or larger quantity thereof may be employed, according as a stronger or weaker paint may be required. For the same reason, it is also immaterial whether the gypsum is added before or after the calcination.

The advantage of my process consists in avoiding the precipitation of the oxide of iron in the liquid way previous to calcination, also in avoiding the loss incident to driving off the sulphuric acid by heat in the ordinary processes of calcining sulphate of iron with gypsum. By my process the sulphuric acid is fixed by the lime as sulphate of lime and the process of manufacture much shortened and cheapened.

I claim—

In making Venetian red, Indian red, and the other colors obtainable from oxide of iron, the process which consists in mixing sulphate of iron with hydrate of lime and calcining the mixture, substantially as set forth.

WETHERILL PETERSON.

Witnesses:
JOHN I. GREEN,
THOS. A. BURTT.